(12) United States Patent
Takeda et al.

(10) Patent No.: US 10,007,079 B2
(45) Date of Patent: Jun. 26, 2018

(54) OPTICAL FIBER UNIT AND OPTICAL FIBER CABLE

(71) Applicant: FUJIKURA LTD., Tokyo (JP)

(72) Inventors: Daiki Takeda, Chiba (JP); Naoki Okada, Chiba (JP); Masayoshi Yamanaka, Chiba (JP); Ken Osato, Chiba (JP); Tomoaki Kaji, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days. days.

(21) Appl. No.: 15/571,103

(22) PCT Filed: Mar. 9, 2016

(86) PCT No.: PCT/JP2016/057329
§ 371 (c)(1),
(2) Date: Nov. 1, 2017

(87) PCT Pub. No.: WO2016/189922
PCT Pub. Date: Dec. 1, 2016

(65) Prior Publication Data
US 2018/0136423 A1    May 17, 2018

(30) Foreign Application Priority Data
May 26, 2015    (JP) ................................. 2015-106598

(51) Int. Cl.
*G02B 6/44* (2006.01)
(52) U.S. Cl.
CPC ......... *G02B 6/4413* (2013.01); *G02B 6/4401* (2013.01)
(58) Field of Classification Search
CPC .................................................. G02B 6/4413
See application file for complete search history.

(56) References Cited

U.S. PATENT DOCUMENTS

| 2011/0211793 A1* | 9/2011 | Barrett ................. G02B 6/4413 385/104 |
| 2016/0103287 A1* | 4/2016 | Jost ........................ G02B 6/441 385/112 |
| 2016/0223769 A1* | 8/2016 | Ito ......................... G02B 6/4405 |
| 2017/0139166 A1* | 5/2017 | Blakley .................... B05D 1/30 |

FOREIGN PATENT DOCUMENTS

| JP | 4439458 B2 * | 3/2010 |
| JP | 2011-169939 A | 9/2011 |
| JP | 2012-088454 A | 5/2012 |

OTHER PUBLICATIONS

International Preliminary Report on Patentability issued in corresponding International Application No. PCT/JP2016/057329 dated Dec. 7, 2017 (6 pages).

* cited by examiner

*Primary Examiner* — Chris Chu
(74) *Attorney, Agent, or Firm* — Osha Liang LLP

(57) ABSTRACT

An optical fiber unit includes: an optical fiber bundle formed by bundling a plurality of optical fibers; and a plurality of bundling members. Each of the bundling members is wound on an outer circumference of the optical fiber bundle along a length direction of the optical fiber bundle while a winding direction of the bundling member is reversed alternately, and joined with another bundling member at reverse sections where the winding direction of the bundling member is reversed. A region surrounded by a pair of the bundling members to be joined at the reverse sections includes a joining point at one of the reverse sections of another pair of the bundling members.

6 Claims, 10 Drawing Sheets

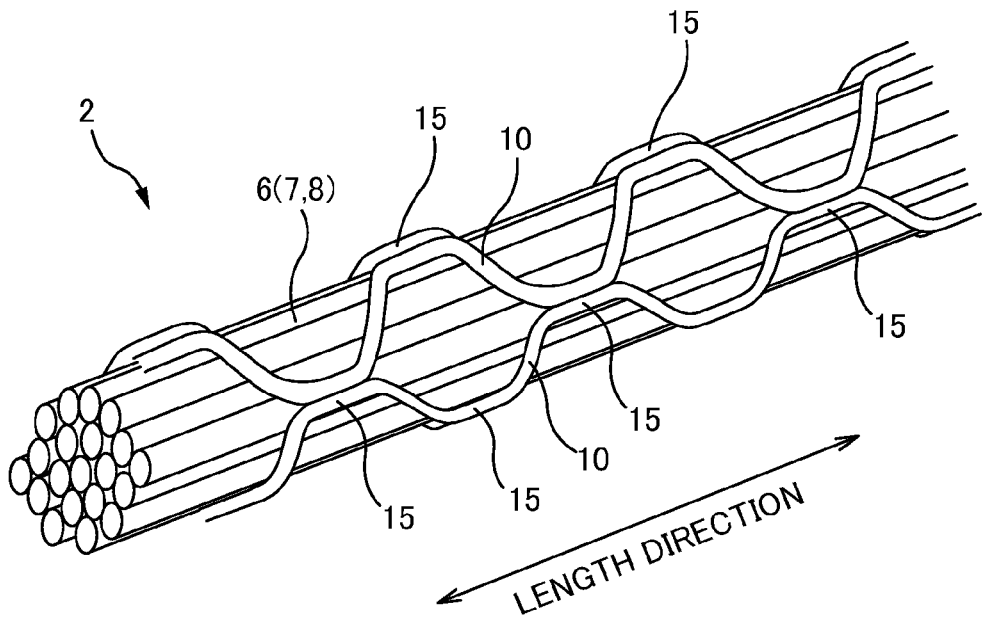
FIG. 12A (COMPARATIVE EXAMPLE)
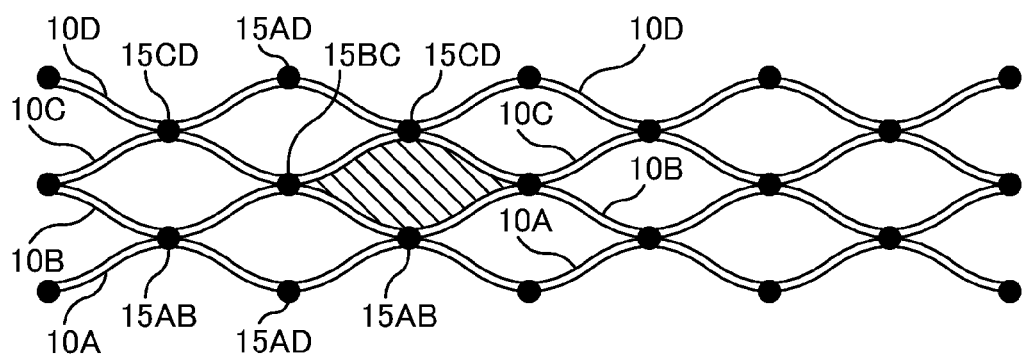
FIG. 12B (COMPARATIVE EXAMPLE)
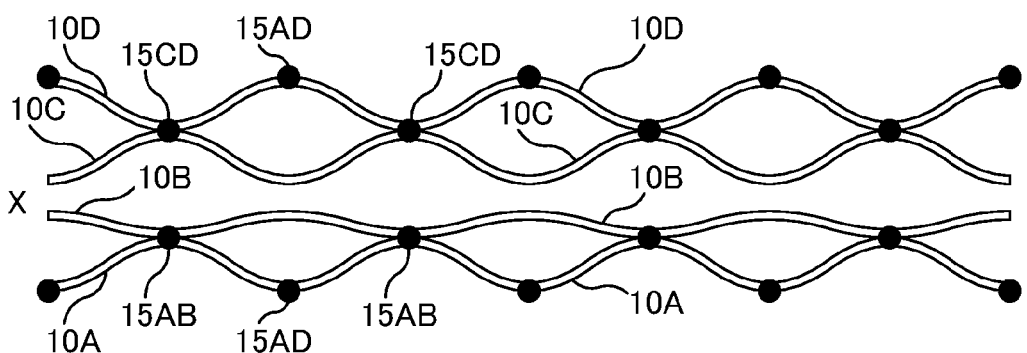
FIG. 12C (COMPARATIVE EXAMPLE)

OPTICAL FIBER UNIT AND OPTICAL FIBER CABLE

TECHNICAL FIELD

One or more embodiments of the present invention relate to an optical fiber unit and an optical fiber cable.

BACKGROUND

Techniques are known for forming an optical fiber cable including optical fiber units which are optical fiber aggregates formed by bundling a plurality of optical fibers. In such techniques, it is common to employ a method wherein a rough winding string (bundling member) is wound around the bundle of optical fibers to thereby suppress/prevent the bundle of optical fibers from falling apart while allowing the optical fiber units to be differentiated from one another by the colors of the bundling members.

In relation to such bundling members, Patent Literature 1 discloses a technique in which a plurality of bundling members are wound helically around a bundle of optical fibers and the bundling members are joined together, to thereby tie the bundle of optical fibers together. Patent Literature 2 (particularly FIG. 7 of Patent Literature 2) discloses a technique wherein the circumference of a bundle of a plurality of optical fibers is bundled with two bundling members by winding the two bundling members in an S-Z configuration, and the two bundling members are bonded and fixed together at reverse sections where their winding directions are reversed.

CITATION LIST

Patent Literature

Patent Literature 1: JP 2011-169939A
Patent Literature 2: JP 2012-88454A

SUMMARY

In Patent Literature 1, a plurality of bundling members are wound helically on the circumference of a bundle of optical fibers, and the bundling members are joined together at their intersection points. Thus, in performing mid-span branching for extracting a specific optical fiber, the joined sections between the bundling members need to be disengaged. At that time, the bundling members need to be retrieved helically, which increases the time and effort for extracting the optical fiber. Also, at the time of retrieving the bundling members, there is a possibility that the optical fibers may break as a result of e.g. the worker's finger getting caught in the optical fibers.

In contrast, a configuration wherein two bundling members are wound in an S-Z configuration around the circumference of the bundle of optical fibers, as in Patent Literature 2, is advantageous in that workability at the time of extracting optical fibers is improved. If, however, there is a defect in the joining of bundling members at reverse sections where their winding directions are reversed, the optical fibers cannot be kept bundled.

One or more embodiments of the present invention may enable the retaining of the bundle of optical fibers even if there is a defect in the joining of bundling members at reverse sections where their winding directions are reversed.

One or more embodiments of the present invention provide an optical fiber unit including: an optical fiber bundle formed by bundling a plurality of optical fibers; and a plurality of bundling members. Each of the bundling members is wound on an outer circumference of the optical fiber bundle along a length direction of the optical fiber bundle while its winding direction is reversed alternately, and joined with another bundling member at reverse sections where its winding direction is reversed. A region surrounded by a pair of the bundling members to be joined at the reverse sections includes a joining point at one of the reverse sections of another pair of the bundling members.

Other features of one or more embodiments of the present invention are made clear by the following description and the drawings.

Advantageous Effects

With one or more embodiments of the present invention, it may be possible to retain the bundle of optical fibers even if there is a defect in the joining of bundling members at reverse sections where their winding directions are reversed.

BRIEF DESCRIPTION OF DRAWINGS

FIG. 12A is a perspective view of an optical fiber unit 2 according to a comparative example. FIG. 12B is a developed view of bundling members 10 for illustrating how the bundling members 10 are wound according to the comparative example. FIG. 12C is a developed view of the bundling members when some joining points 15 are faulty in the comparative example.

DETAILED DESCRIPTION

Figure 1A:
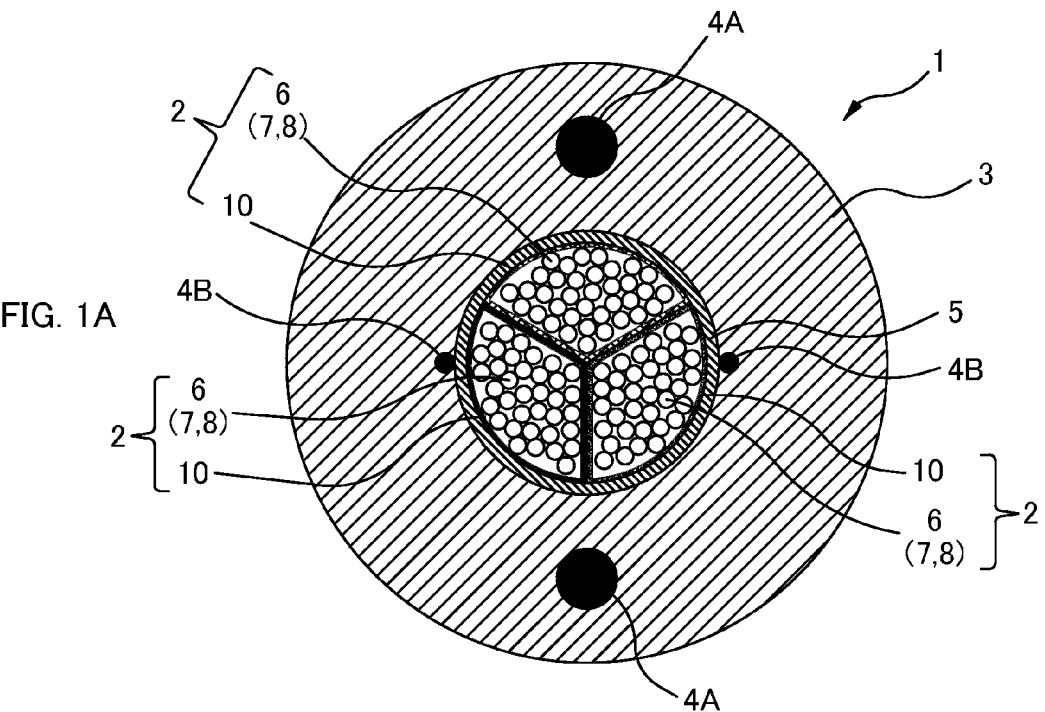
FIG. 1A is a cross-sectional view of an optical fiber cable 1 including optical fiber units 2.

At least the following matters are made clear from the following description and the drawings.

According to one or more embodiments, an optical fiber unit includes: an optical fiber bundle formed by bundling a plurality of optical fibers; and a plurality of bundling members. Each of the bundling members is wound on an outer circumference of the optical fiber bundle along a length direction of the optical fiber bundle while its winding direction is reversed alternately, and joined with another bundling member at reverse sections where its winding direction is reversed. A region surrounded by a pair of the bundling members to be joined at the reverse sections includes a joining point at one of the reverse sections of another pair of the bundling members. With this optical fiber unit, even if the joining of the bundling members at the reverse sections where their winding directions are reversed is faulty, it is possible to retain the bundle of the optical fibers.

In one or more embodiments, one pair of the bundling members is wound around the entire circumference of the optical fiber bundle; and another pair of the bundling members is wound around the entire circumference of the optical fiber bundle. In this way, even if the joining points of one of the pairs of bundling members are consecutively faulty, the other of the pairs of bundling members can retain the bundle of the optical fibers.

In one or more embodiments, the bundling member is joined with said another bundling member at the reverse sections, and is also joined with a different bundling member from said another bundling member at intersection points between said different bundling member and the bundling member. In this way, the joining of the bundling members is strengthened.

In one or more embodiments, a joining point at one of the reverse sections of one pair of the bundling members and another joining point which is at one of the reverse sections of a different pair of the bundling members and which is in a region surrounded by said one pair of the bundling members joined at said joining point are arranged along the length direction of the optical fiber bundle. In this way, the joining points are easy to separate.

In one or more embodiments, the aforementioned region includes a plurality of joining points at the reverse sections of other pairs of the bundling members. In this way, the joining of the bundling members is strengthened.

Further, according to one or more embodiments, an optical fiber cable includes: a plurality of optical fiber units; and an outer sheath that covers the plurality of optical fiber units. Each of the optical fiber units includes an optical fiber bundle formed by bundling a plurality of optical fibers, and a plurality of bundling members. Each of the bundling members is wound on an outer circumference of the optical fiber bundle along a length direction of the optical fiber bundle while its winding direction is reversed alternately, and joined with another bundling member at reverse sections where its winding direction is reversed. A region surrounded by a pair of the bundling members to be joined at the reverse sections includes a joining point at one of the reverse sections of another pair of the bundling members. In this way, even if the joining of the bundling members at the reverse sections where their winding directions are reversed is faulty, it is possible to retain the bundle of the optical fibers.

First Embodiment

Structure of Optical Fiber Unit 2, Etc.:

FIG. 1A is a cross-sectional view of an optical fiber cable 1 including optical fiber units 2. The optical fiber cable 1 includes: a plurality of optical fiber units 2; and an outer sheath 3. Each optical fiber unit 2 has a structure wherein a plurality of optical fibers 8 are bundled by bundling members 10. The structure of the optical fiber unit 2 is described in detail further below. In this example, the optical fiber cable 1 includes three optical fiber units 2. The three optical fiber units 2 are covered by a wrapping tape 5, and the outer side thereof is covered by the outer sheath 3. Tension members 4A and rip cords 4B are embedded in the outer sheath 3.

Figure 1B:
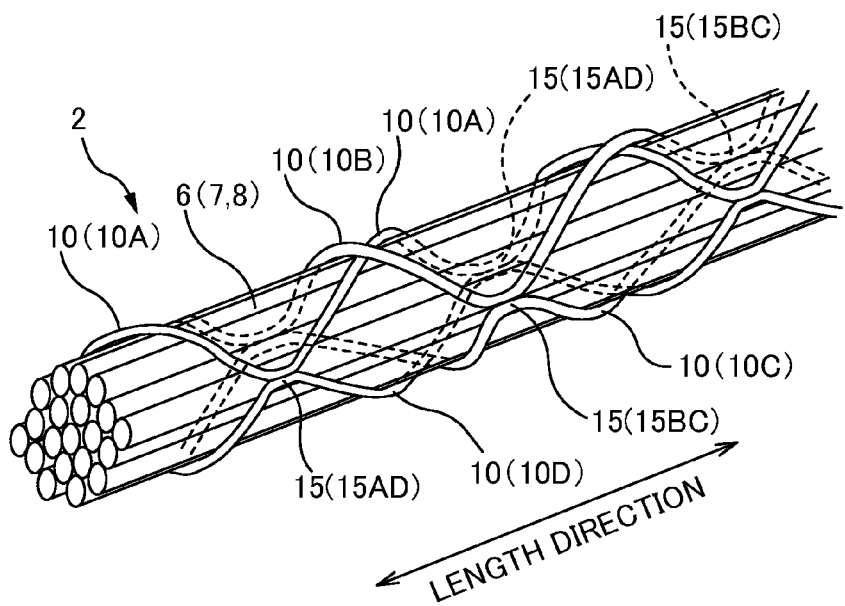
FIG. 1B is a perspective view of an optical fiber unit 2 according to a first embodiment.

FIG. 1B is a perspective view of the optical fiber unit 2 according to the first embodiment. The optical fiber unit 2 has a structure wherein a bundle of a plurality of optical fibers 8 (i.e., an optical fiber bundle 6) is bundled by bundling members 10. The bundling members 10 are wound on the outer circumference of the optical fiber bundle 6, and thus, the plurality of optical fibers 8 are bundled together and are prevented from falling apart. In this example, the optical fiber bundle 6 is constituted by bundling together a plurality of intermittently connected optical fiber ribbons 7.

Figure 2:
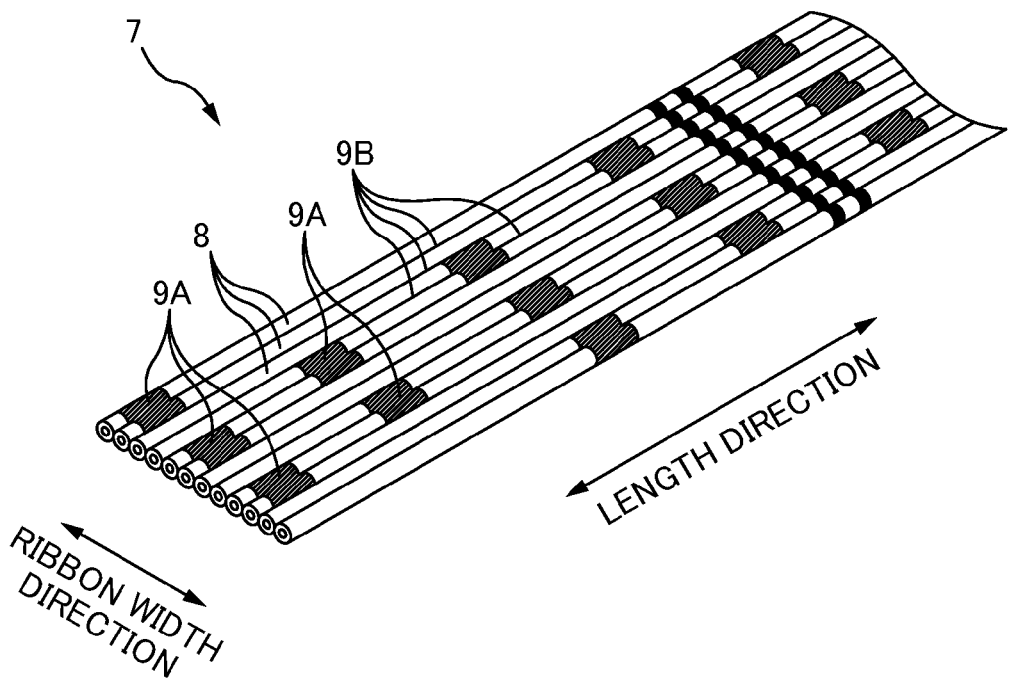
FIG. 2 is a diagram illustrating an intermittently connected optical fiber ribbon 7.

FIG. 2 is a diagram illustrating an example of an intermittently connected optical fiber ribbon 7.

The intermittently connected optical fiber ribbon 7 is an optical fiber ribbon 7 including a plurality of optical fibers (twelve in this example) arranged side by side and connected intermittently. Two adjacent ones of the optical fibers 8 are connected by a connection part 9A. Between two adjacent optical fibers 8, a plurality of connection parts 9A are arranged intermittently in the length direction. The plurality of connection parts 9A of the intermittently connected optical fiber ribbon 7 are arranged intermittently and two-dimensionally in the length direction and the ribbon's width direction. Regions other than the connection parts 9A between the two adjacent optical fibers 8 constitute non-connected parts 9B. In the non-connected parts 9B, the two adjacent optical fibers 8 are not restrained. Thus, the intermittently connected optical fiber ribbon 7 can be rolled up into a cylindrical form (a bundle), or folded up, and the multitude of optical fibers 8 can be bundled with high density.

It should be noted that the intermittently connected optical fiber ribbon 7 constituting the optical fiber bundle 6 is not limited to the example illustrated in the figure. For example, the arrangement of the connection parts 9A may be changed. Also, the number of optical fibers 8 constituting the intermittently connected optical fiber ribbon 7 may be changed. Further, the optical fiber bundle 6 does not have to be constituted by an intermittently connected optical fiber ribbon 7, but may instead be constituted by, for example, bundling a plurality of separate optical fibers 8.

The bundling member 10 is a member that bundles the plurality of optical fibers 8 together. The bundling member 10 is a thread-form, cord-form, or tape-form member capable of tying the plurality of optical fibers 8 together. Each bundling member 10 is wound on the outer circumference of the optical fiber bundle 6. In the illustrated optical fiber unit 2, the optical fiber bundle 6 is bundled by four bundling members 10, but there may be four or more bundling members 10 in the optical fiber unit 2, as will be described further below. In the description below, the bundling members 10 may be indicated with indexes (A to D) so that the bundling members 10 are distinguished from one another for explanation.

A predetermined color is applied to each bundling member 10, and thus, the bundling member also functions as an identification member. The bundling members 10 in each optical fiber unit 2 have different colors, and can thus be differentiated from one another. In cases where each optical fiber unit 2 includes two bundling members 10 as illustrated in the figures, it is also possible to differentiate the optical fiber units 2 from one another by the combination of colors of the bundling members 10. Instead of coloring the bundling members 10, an identification mark may be printed on the surface of each bundling member 10.

Figure 3:
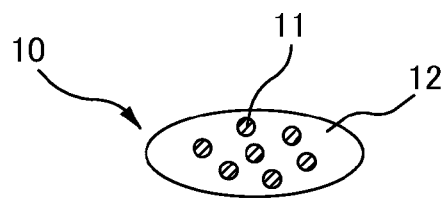
FIG. 3 is a diagram illustrating a cross-sectional structure of a bundling member 10.

FIG. 3 is a diagram illustrating a cross-sectional structure of the bundling member 10. The bundling member 10 includes core parts 11 and a cover part 12. The core parts 11 are members that extend along the length direction of the optical fiber unit 2, and the bundling member 10 includes a plurality of the core parts 11. The cover part 12 is a member that covers the outer circumference of each of the core parts 11, and that has a lower melting point than the melting point of the core parts 11. The two bundling members 10 which bundle the optical fiber unit 2 are thermally fusion-bonded at intersection points therebetween by the adhesiveness that arises by heating the cover part 12 at a temperature equal to or higher than the melting point. In one or more embodiments, the difference between the melting point of the core part 11 and the melting point of the cover part 12 is 20° C. or greater. The melting point of the core part 11 may be from 200 to 230° C., and the melting point of the cover part 12 may be from 150 to 180° C. It is possible that: even when the cover part 12 is heated and molten, the cover part 12 either does not bond with the optical fibers 8 or has a weak adhesive force even if it bonds with the optical fibers; and the cover part does not cause degradation of the cover layer(s) of the optical fibers 8.

As for the core parts 11 and the cover part 12, it is possible to use, for example, a high melting point resin such as polypropylene (PP), polyamide (PA) or polyethylene terephthalate (PET), or a high melting point fiber such as polypropylene fiber, polyamide fiber (e.g. nylon (registered trademark)) or polyester fiber (e.g. PET fiber), or a high melting point tape or film made of e.g. PET or PP, covered by: a thermoplastic resin which is capable of reversibly repeating softening and hardening by heating and cooling, e.g. a low melting point resin such as polyethylene (PE), ethylene-vinyl acetate copolymer (EVA) or ethylene-ethyl acrylate copolymer (EEA); or a so-called hot-melt adhesive which employs a thermoplastic resin or rubber as a base and which is capable of reversibly repeating softening and hardening by heating and cooling.

It should be noted that the bundling members 10 do not have to be a composite material of a high melting point material (core parts 11) and a low melting point material (cover part 12) as illustrated in FIG. 3, and instead may be constituted by a single material. For example, each bundling member may be constituted by either a high melting point material or a low melting point material; also, the two bundling members 10 may be constituted by different materials.

The width of the bundling member 10 is, in one or more embodiments, from 1 mm to 2 mm inclusive. If the width of the bundling member 10 is narrower than 1 mm, the bundling member may break at the time of fusion-bonding. If the width of the bundling member 10 is wider than 2 mm, heat may not be transferred sufficiently, making fusion-bonding difficult. In the present embodiment, a bundling member 10 having a width of from 1.8 to 1.9 mm (thickness: 0.1 mm) is used.

Figure 4:
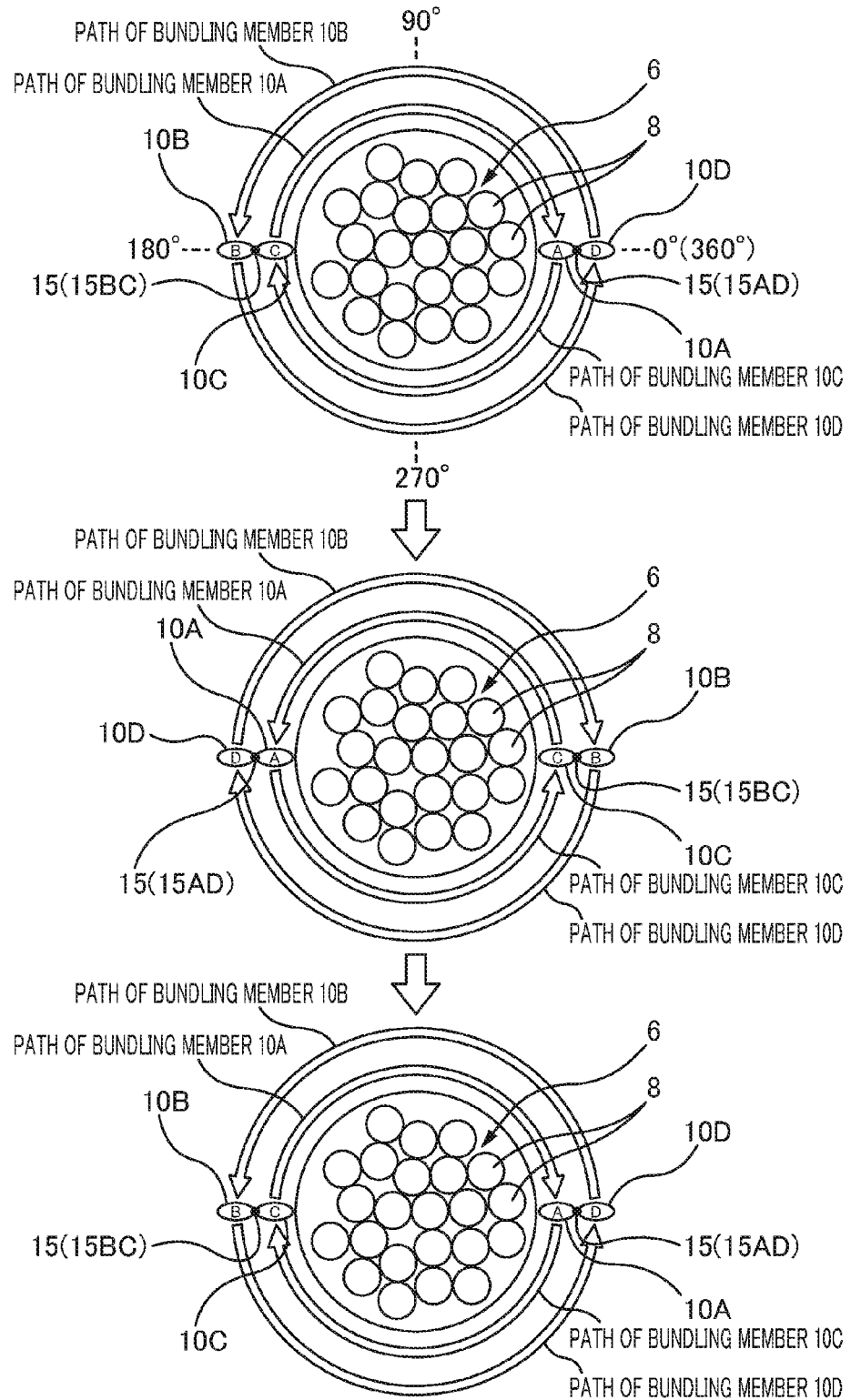
FIG. 4 is an explanatory diagram for illustrating how the bundling members 10 are wound.
Figure 5A:
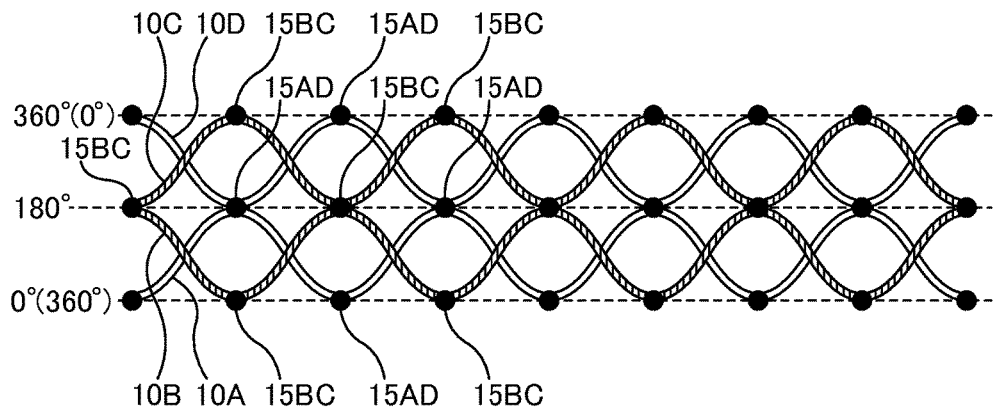
FIG. 5A is a developed view of the bundling members 10 for illustrating how the bundling members 10 are wound.

FIG. 4 is an explanatory diagram for illustrating how the bundling members 10 are wound. FIG. 5A is a developed view of the bundling members 10 for illustrating how the bundling members 10 are wound. In FIG. 5A, a position on the outer circumferential surface of the optical fiber bundle 6 is illustrated in a cylindrical coordinate system on the assumption that the outer circumferential surface of the optical fiber bundle 6 is a circumferential surface. Accordingly, the horizontal axis in FIG. 5A indicates a position in the length direction. Further, the vertical axis therein indicates an angle from a reference position (0 degrees) and indicates a position in the circumferential direction on the outer circumferential surface of the optical fiber bundle 6. How the bundling members 10 are wound around the optical fiber bundle 6 is described below also with reference to FIG. 1B.

Each bundling member 10 is wound on the outer circumference of the optical fiber bundle 6 and is arranged along the length direction of the optical fiber unit 2 such that the bundling member depicts an arc covering half the circumference of the bundle (i.e., 180 degrees). The bundling member 10 is joined (fusion-bonded) with another bundling member 10 at a joining point 15. Further, the winding direction, with respect to the optical fiber bundle 6, of the bundling member 10 is reversed at the joining point 15 (fusion-bonded point) with another bundling member 10. In this way, the bundling members 10 are wound around the optical fiber bundle 6 in an S-Z configuration. In the description below, the joining point 15 between a bundling member 10A and a bundling member 10D is indicated with an index AD while the joining point 15 between a bundling member 10B and a bundling member 10C is indicated with an index BC, so that the joining points 15 may be distinguished from one another for explanation.

Each bundling member 10 is wound on the outer circumference of the optical fiber bundle 6 along the length direction of the optical fiber bundle 6 while the winding direction of the bundling member 10 is reversed alternately. Each bundling member 10 is joined with another bundling member 10 at reverse sections where their winding directions are reversed. In this way, if the joining points at the reverse sections are separated, the bundling members 10 covering the outer circumference of the optical fiber bundle 6 in a mesh pattern can be opened and the optical fiber(s) 8 can be extracted from the optical fiber unit 2. If the bundling members 10 are wound helically in one direction on the outer circumference of the optical fiber bundle 6, it is necessary to helically retrieve or cut the bundling members 10, thus increasing the time and effort for extracting the optical fiber(s) 8. Stated differently, if the bundling members 10 are wound helically in one direction, it takes time to unwind the helically-wound bundling members 10. In contrast, in the present embodiment, the optical fiber(s) 8 can be extracted by simply disengaging the joining point 15 at the time of, for example, mid-span branching, thus facilitating the extraction work. Stated differently, in the optical fiber unit 2 wherein the bundling members 10 are wound in the S-Z configuration, a worker can easily separate the bundling members 10 by pulling them at the terminal, and thus, the time required for work can be shortened compared to cases where the bundling members 10 are wound helically in one direction.

It may be that the joining strength at the joining point 15 is of a degree at which the joining point 15 is not ruptured unexpectedly but can be separated easily with the worker's hands. It may be that the force necessary for separating the joining point 15 between the bundling members 10 is smaller than the force required for cutting the bundling member 10, and so, the joining strength of the bundling members 10 may be less than or equal to the breaking strength of each bundling member 10. Further, it may be that the two bundling members 10 can be re-joined by applying heat with a heater or by applying an adhesive after the extraction of the optical fiber(s) 8 in the mid-span branching.

As illustrated in FIG. 4, when the optical fiber unit 2 is viewed from one side in the length direction, the joining points 15 are arranged so as to sandwich the optical fiber bundle 6. For the sake of explanation, it is assumed that one of the joining points 15 is positioned at the reference position (0 degrees), and that the other joining point is positioned at 180 degrees. In the first embodiment, joining points 15AD and joining points 15BC are located at the reference position and the position at 180 degrees.

First, a description will be given below of how the bundling member 10A and the bundling member 10D among the four bundling members 10 are wound. The bundling member 10A is wound clockwise on the outer circumference of the optical fiber bundle 6 (cf. upper diagram of FIG. 4), and is joined with the bundling member 10D at a joining point 15AD (cf. upper diagram of FIG. 4); then, its winding direction is reversed, and the bundling member 10A is then wound counter-clockwise on the outer circumference of the optical fiber bundle 6 (cf. center diagram of FIG. 4), is joined with the bundling member D at a joining point 15AD (cf. center diagram of FIG. 4), and then is again wound clockwise on the outer circumference of the optical fiber bundle 6 (cf. lower diagram of FIG. 4 (or upper diagram FIG. 4)); and the aforementioned steps are repeated. The bundling member 10D is wound counter-clockwise on the outer circumference of the optical fiber bundle 6 (cf. upper diagram of FIG. 4), and is joined with the bundling member 10A at the joining point 15AD (cf. upper diagram of FIG. 4); then, its winding direction is reversed, and the bundling member 10D is then wound clockwise on the outer circumference of the optical fiber bundle 6 (cf. center diagram of FIG. 4), is joined with the bundling member 10A at the joining point 15AD (cf. center diagram of FIG. 4), and then is again wound counter-clockwise on the outer circumference of the optical fiber bundle 6 (cf. lower diagram of FIG. 4 (or upper diagram of FIG. 4)); and the aforementioned steps are repeated. In this way, the bundling member 10A and the bundling member 10D are wound with respect to the optical fiber bundle 6 in the S-Z configuration, as illustrated in FIG. 1B. Further, as illustrated in FIG. 4, when the optical fiber unit 2 is viewed from one side in the length direction, the two joining points 15AD are arranged so as to sandwich the optical fiber bundle (the joining points 15AD are arranged at the positions at 0 degrees and 180 degrees).

Similarly, the bundling member 10B and the bundling member 10C are wound with respect to the optical fiber bundle 6 in the S-Z configuration, as illustrated in FIG. 1B. Further, as illustrated in FIG. 4, when the optical fiber unit 2 is viewed from one side in the length direction, the two joining points 15BC are arranged so as to sandwich the optical fiber bundle 6 (the joining points 15BC are arranged at the positions at 0 degrees and 180 degrees).

There are two pairs of bundling members 10 (a pair of the bundling member 10A and the bundling member 10D and a pair of the bundling member 10B and the bundling member 10C) whose winding directions are reversed at the joining points 15. The phase of one of the pairs of the bundling members 10 (for example, the bundling member 10A and the bundling member 10D) is shifted from that of the other pair of the bundling members 10 (for example, the bundling member 10B and the bundling member 10C) by 180 degrees (cf. FIG. 5A). Thus, the position of the joining point 15 (for example, the joining point 15AD) of one of the pairs of the bundling members 10 is shifted in the length direction from that of the joining point (for example, the joining point 15BC) of the other pair of the bundling members 10.

Further, the bundling member 10A and the bundling member 10B are both wound on the outer circumference of the optical fiber bundle 6 within a range from the reference position (0 degrees) to 180 degrees. At the same time, the phase of the bundling member 10A is shifted from that of the bundling member 10B by 180 degrees (cf. FIG. 5A). For this reason, there are intersection points between the bundling member 10A and the bundling member 10B at positions at approximately 90 degrees.

Similarly, the bundling member 10C and the bundling member 10D are both wound on the outer circumference of the optical fiber bundle within a range from 180 degrees to 360 degrees (0 degrees). At the same time, the phase of the bundling member 10C is shifted from that of the bundling member 10D by 180 degrees (cf. FIG. 5A). For this reason, there are intersection points between the bundling member 10C and the bundling member 10D at positions at approximately 270 degrees.

Figure 5B:
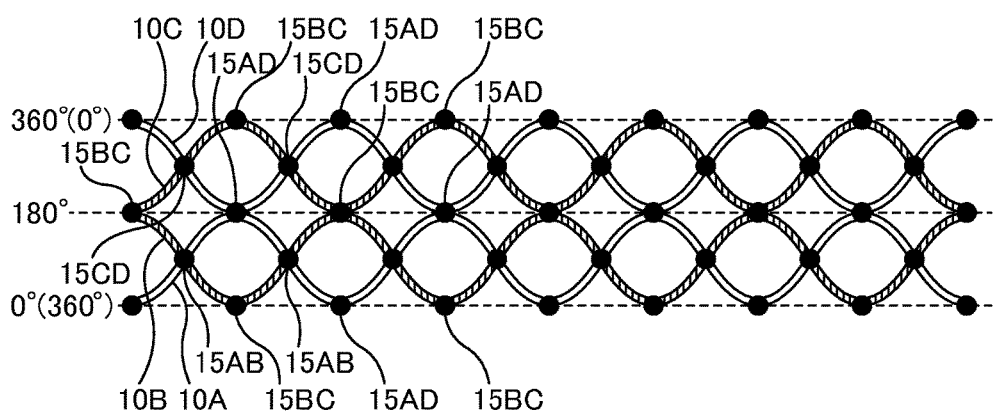
FIG. 5B is a developed view for illustrating joining points in a modified example.

In FIG. 5A, the joined sections 15 between the bundling members 10 are only at the reverse sections where their winding directions with respect to the optical fiber bundle 6 are reversed, but the joined sections between the bundling members 10 are not limited thereto. FIG. 5B is a developed view illustrating joining points in a modified example. As illustrated in FIG. 5B, each of the bundling members 10 may not only be joined at the reverse sections where its winding direction with respect to the optical fiber bundle 6 is reversed, but may also be joined with the other bundling member 10 at the intersection points where the bundling member 10 and the other bundling member 10 intersect. For example, the bundling member 10A is not only joined with the bundling member 10D at the reverse sections where their winding directions with respect to the optical fiber bundle 6 are reversed, but also joined with the bundling member 10B at the intersection points where the bundling member 10A and the bundling member 10B intersect.

Faulty Joining:

FIG. 12A is a perspective view of an optical fiber unit 2 according to a comparative example. Also in the comparative example, the winding direction, with respect to an optical fiber bundle 6, of each S-Z-wound bundling member 10 is reversed at joining points 15 with another bundling member 10.

FIG. 12B is a developed view of the bundling members 10 for illustrating how the bundling members 10 are wound according to the comparative example. In FIG. 12B, a region surrounded by a bundling member 10B and a bundling member 10C corresponding to one pitch is cross-hatched. In other words, one mesh cell formed of the pair of bundling members 10 (the bundling member 10B and the bundling member 10C) joined at joining points 15BC is cross-hatched. In the comparative example, as illustrated in the figure, the cross-hatched region includes no joining point of any other bundling member 10 (a bundling member 10A or a bundling member 10D).

Further, in the comparative example, a range on the outer circumferential surface of the optical fiber bundle 6 occupied by one bundling member 10 does not include another bundling member 10. For example, the range from 90 degrees to 180 degrees on the outer circumferential surface of the optical fiber bundle 6 occupied by the bundling member 10B does not include any other bundling member 10.

FIG. 12C is a developed view of the bundling members when some of the joining points 15 are faulty in the comparative example. This drawing illustrates the developed view of the bundling members 10 when the joining points 15BC of the bundling member 10B are faulty. For example, if an abnormality occurs in the bundling member 10B when the optical fiber unit 2 is produced, or if an abnormal tension is applied to the bundling member 10B after the optical fiber unit 2 is produced, the joining points 15BC may not be formed or the joining points 15BC may be ruptured, thereby causing the joining points 15BC to be consecutively faulty, as illustrated in FIG. 12C. If the joining points 15BC are consecutively faulty, the bundling member 10B and the bundling member 10C are separated.

In the comparative example, if the joining points 15BC of the bundling member 10B are consecutively faulty, the mesh of the bundling members 10 that covers the outer circumference of the optical fiber bundle 6 breaks, resulting in a state where the optical fiber bundle 6 cannot be bundled. Hence, in the comparative example, when some of the joining points of the bundling member 10 are faulty, the plurality of optical fibers constituting the optical fiber bundle 6 may fall apart.

Figure 6A:
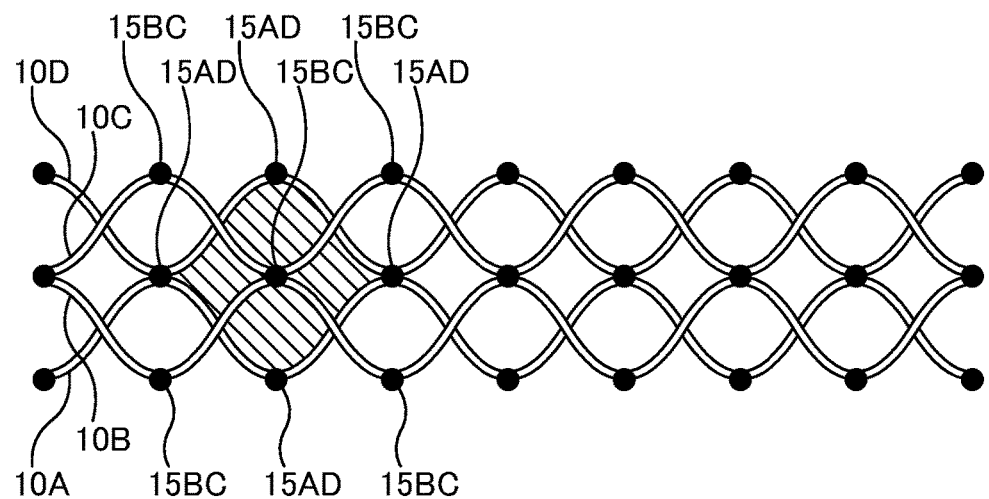
FIG. 6A illustrates a region surrounded by a pair of bundling members 10 joined at reverse sections according to the present embodiment.

FIG. 6A illustrates a region surrounded by a pair of bundling members 10 joined at the reverse sections according to the present embodiment. In the figure, the cross-hatching indicates a region surrounded by the bundling member 10A and the bundling member 10D between a joining point 15AD at a reverse section where their winding directions are reversed in a predetermined direction and a joining point 15AD at the next reverse section where their winding directions are reversed in the same direction. Stated differently, the region surrounded by the bundling member 10A and the bundling member 10D corresponding to one pitch is cross-hatched. In other words, one mesh cell formed of the pair of bundling members 10 (the bundling member 10A and the bundling member 10D) joined at the joining points 15AD is cross-hatched.

In the present embodiment, the cross-hatched region includes a joining point 15BC at a reverse section of another pair of bundling members 10 (the bundling member 10B and the bundling member 10C). That is, in the present embodiment, a region surrounded by a pair of bundling members 10 (the bundling member 10A and the bundling member 10D in this example) to be joined at the reverse sections—where their winding directions are reversed in the predetermined direction—includes a joining point 15 at a reverse section of another pair of bundling members 10 (the bundling member 10B and the bundling member 10C in this example).

Figure 6B:
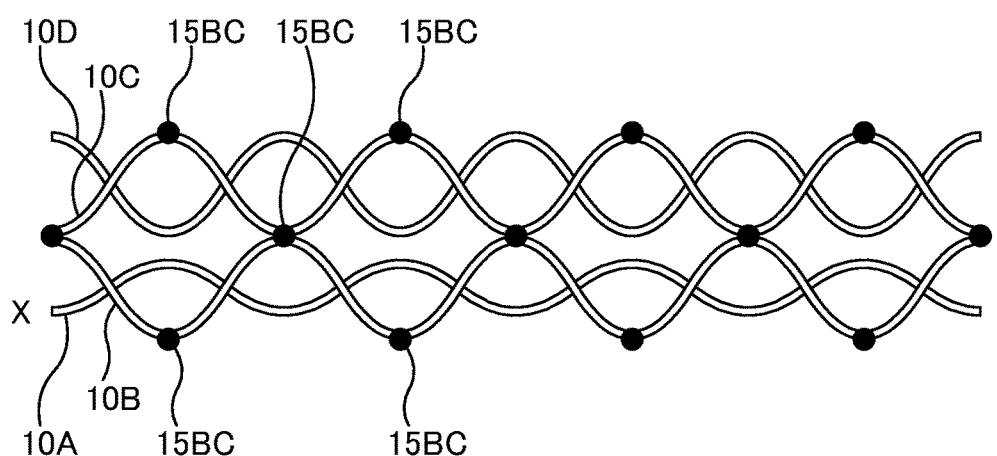
FIG. 6B is a developed view of the bundling members 10 when joining points 15AD are faulty.

FIG. 6B is a developed view of the bundling members 10 when some of the joining points 15AD are faulty. Also in the present embodiment, if the joining points 15AD are consecutively faulty, the bundling member 10A and the bundling member 10D are separated.

In the present embodiment, however, the cross-hatched region includes the joining point 15BC, as illustrated in FIG. 6A. With this configuration, even if the joining points 15AD are consecutively faulty, the joining point 15BC (joining point in the cross-hatched region) prevents the mesh of the bundling members 10, which covers the outer circumference of the optical fiber bundle 6, from breaking and opening up. Therefore, in the present embodiment, even if the joining points 15AD are consecutively faulty, it is possible to keep the state where the optical fiber bundle 6 is bundled by the bundling members 10.

In the present embodiment, a range on the outer circumferential surface of the optical fiber bundle 6 occupied by one bundling member 10 includes another bundling member 10. For example, as illustrated in FIG. 6A, the range from 0 degrees to 180 degrees on the outer circumferential surface of the optical fiber bundle 6 occupied by the bundling member 10A includes another bundling member 10B. In other words, in the present embodiment, the range on the outer circumferential surface of the optical fiber bundle 6 occupied by the one bundling member 10 overlaps the range on the outer circumferential surface of the optical fiber bundle 6 occupied by another bundling member 10. With this configuration, as illustrated in FIG. 6C, even if the joining points 15AD are consecutively faulty and thereby the bundling member 10A cannot perform the function of bundling the optical fiber bundle 6, the other bundling member 10B prevents the mesh of the bundling members 10, which covers the outer circumference of the optical fiber bundle 6, from breaking and opening up.

Further, in the present embodiment, there are two pairs of bundling members 10 whose winding directions are reversed at the joining points 15. One of the pairs of bundling members 10 is wound around the entire circumference of the optical fiber bundle 6, and also, the other pair of bundling members 10 is wound around the entire circumference of the optical fiber bundle 6. More specifically, the pair of bundling members 10 consisting of the bundling member 10A and the bundling member 10D is wound around the entire circumference of the optical fiber bundle 6, and also, the pair of bundling members 10 consisting of the bundling member 10B and the bundling member 10C is wound around the entire circumference of the optical fiber bundle 6. With this configuration, even if the joining points 15 (for example, the bundling members 15AD) of one of the pairs of bundling members 10 (for example, the bundling member 10A and the bundling member 10D) are consecutively faulty, the other pair of bundling members 10 (for example, the bundling member 10B and the bundling member 10C) can keep the state where the optical fiber bundle 6 is bundled.

Further, as illustrated in FIG. 5B, the bundling member 10A may not only be joined with the bundling member 10D (corresponding to "another bundling member") at the reverse sections where the winding direction of the bundling member 10A with respect to the optical fiber bundle 6 is reversed, but may also be joined with the bundling member 10B (corresponding to a "different bundling member from said another bundling member") at the intersection points between the bundling member 10B and the bundling member 10A. In this manner, each bundling member 10 is not only joined at the reverse sections where its winding direction with respect to the optical fiber bundle 6 is reversed, but also joined at intersection points where the bundling member 10 and another bundling member 10 intersect, thereby strengthening the joining of the bundling members 10. This makes it easier to keep the state where the optical fiber bundle 6 is bundled.

At the time of mid-span branching of the optical fiber cable 1 in the present embodiment, a worker separates one joining point 15 (for example, the joining point 15AD) with the worker's hands, and the worker then separates the joining point (for example, the joining point 15BC) of another pair of bundling members 10 which is in the region surrounded by the pair of bundling members 10 joined at the one joining point 15. In other words, after separating one joining point 15 (for example, the joining point 15AD) with the worker's hands, the worker separates another joining point (for example, the joining point 15BC) in the mesh cell formed of the pair of bundling members 10 joined at the one joining point 15. In this way, the bundling members 10 covering the outer circumference of the optical fiber bundle 6 in a mesh pattern can be opened, and the optical fiber(s) 8 can be extracted. Also, when the worker repeats the separation work, the bundling members 10 covering the outer circumference of the optical fiber bundle 6 in a mesh pattern can be opened along the length direction.

According to the optical fiber unit in the present embodiment, the joining points 15 to be separated at the time of branching are arranged along the length direction. In other words, one joining point 15 (for example, the joining point 15AD) and another joining point 15 (for example, the joining point 15BC) which is of a different pair of bundling members 10 and which is in the region (the cross-hatched region of FIG. 5A) surrounded by the pair of bundling members 10 joined at the one joining point 15 are arranged along the length direction. Accordingly, after separating a discretionary joining point 15, the worker can sequentially separate the joining points 15 adjacent to the separated joining point 15 in the length direction with the separated joining point 15 as a starting point. Thus, it is easier to locate the joining points 15 to separate.

Method for Producing Optical Fiber Unit 2:

Hereinafter, a method for producing an optical fiber unit 2 including four bundling members 10 joined as illustrated in FIG. 5B is described.

Figure 7:
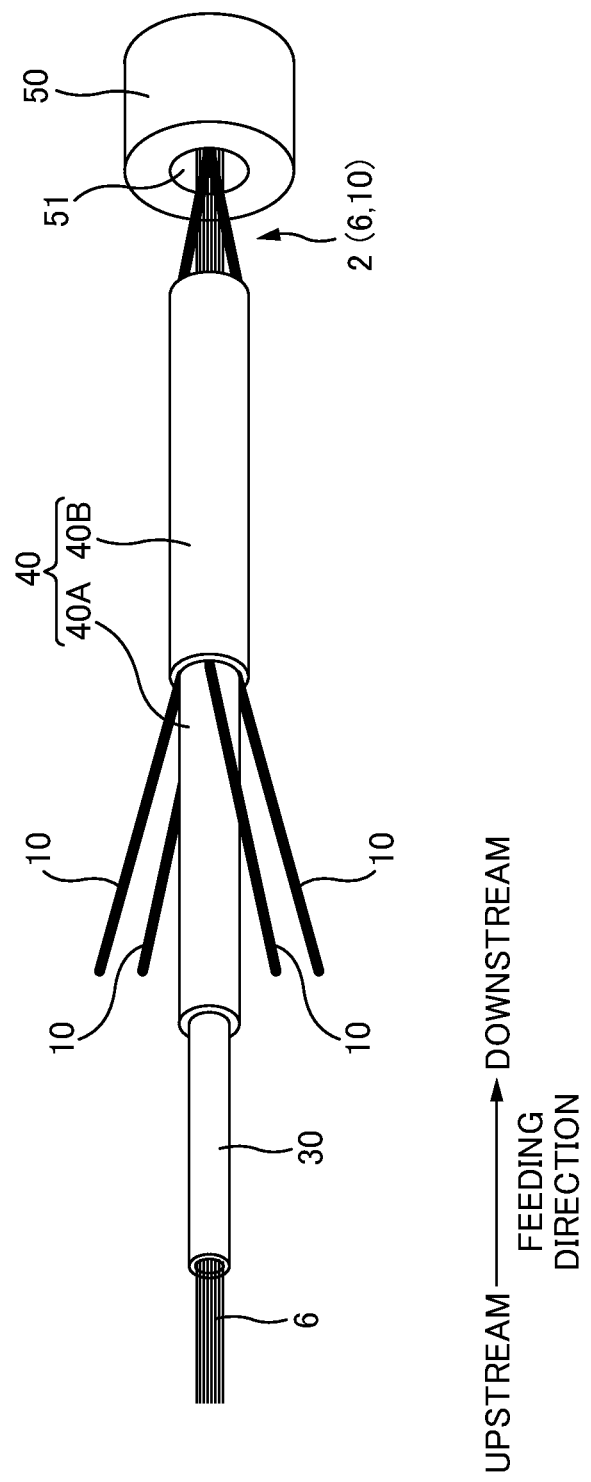
FIG. 7 is a diagram schematically illustrating a production device 20 for producing the optical fiber unit 2.
Figure 8A:
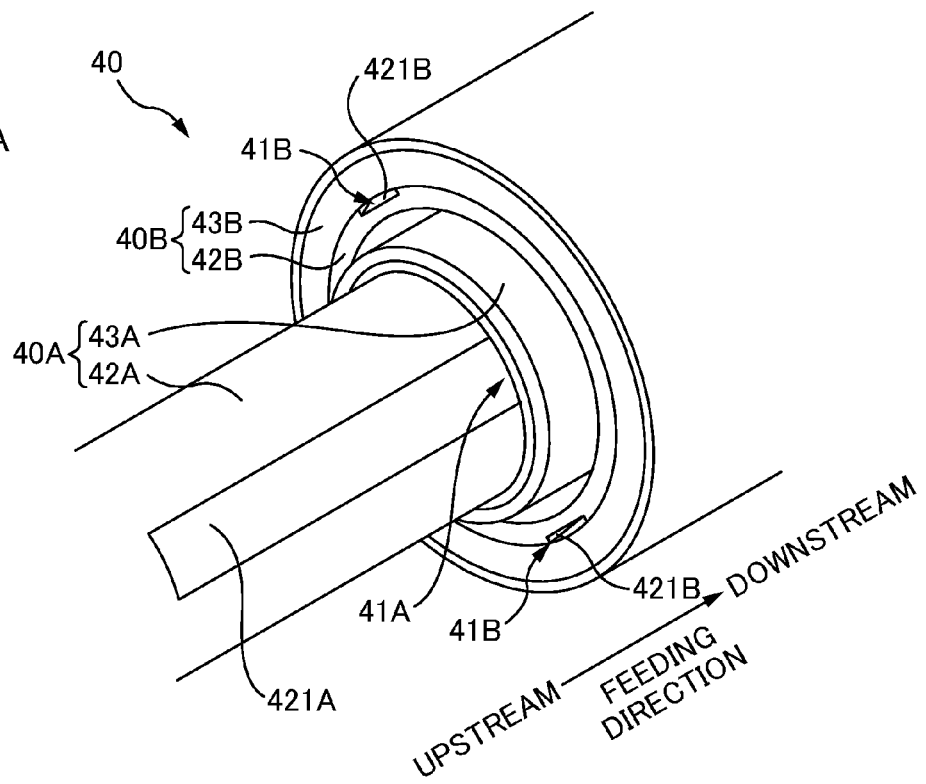
FIG. 8A is a perspective view in the vicinity of an inlet of a bundling member passage part 41 (first bundling member passage parts 41A and second bundling member passage parts 41B) provided to a rotating member 40.
Figure 8B:
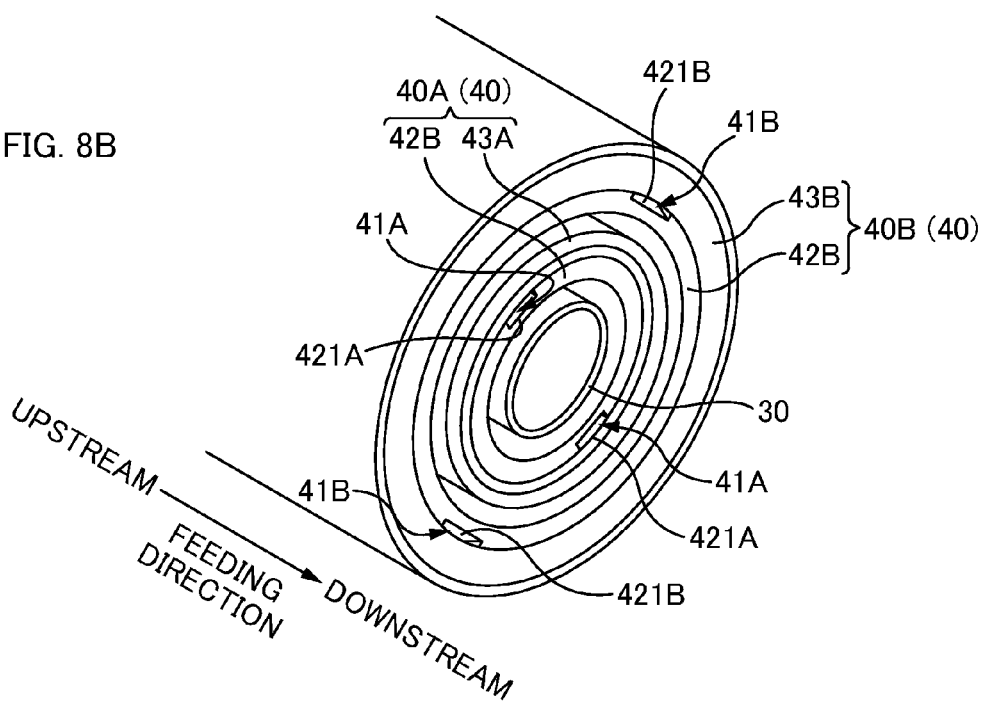
FIG. 8B is a perspective view in the vicinity of an outlet of the bundling member passage part 41.

FIG. 7 is a diagram schematically illustrating a production device 20 for producing an optical fiber unit 2. FIG. 8A is a perspective view in the vicinity of an inlet of a bundling member passage part 41 (first bundling member passage parts 41A and second bundling member passage parts 41B) provided to a rotating member 40. FIG. 8B is a perspective view in the vicinity of an outlet of the bundling member passage part 41. In the description below, the direction in which the optical fiber bundle 6 is fed is referred to as a "feeding direction". In the figure, the direction from left to right is the feeding direction.

The production device 20 is a production device for producing the optical fiber unit 2 by winding the bundling members 10 (in this example, four bundling members 10) on the outer circumference of an optical fiber bundle 6 formed by bundling a plurality of optical fibers 8. The production device 20 includes a fiber passage pipe 30, a rotating member 40 (a first rotating member 40A and a second rotating member 40B), and a heating unit 50.

The fiber passage pipe 30 is a fiber passage member for feeding the optical fiber bundle 6 in the feeding direction. The fiber passage pipe 30 is a circular-cylindrical (tubular) member. The optical fiber bundle 6 enters the fiber passage pipe 30 from an opening (inlet) on the upstream side in the feeding direction, passes through the fiber passage pipe 30, and is fed in the feeding direction from an opening (outlet) on the downstream side in the feeding direction. The heating unit 50 is arranged downstream from the fiber passage pipe 30. The optical fiber bundle 6 that has passed through the fiber passage pipe 30 is immediately fed into the heating unit 50.

The rotating member 40 is a rotating element that is arranged to the outer circumference of the fiber passage pipe 30 and that feeds the bundling members 10 while oscillating, with the feeding direction serving as the axis. The rotating member 40 includes a first rotating member 40A and a second rotating member 40B. The first rotating member 40A is a circular-cylindrical member that is arranged to the outer circumference of the fiber passage pipe 30 (fiber passage member). The second rotating member 40B is a circular-cylindrical member that is arranged to the outer circumference of the first rotating member 40A. The first rotating member 40A and the second rotating member 40B oscillate while rotating in opposite directions from one another.

The first rotating member 40A is provided rotatably with respect to the fiber passage pipe 30 (fiber passage member). The first rotating member 40A has two first bundling member passage parts 41A. The two first bundling member passage parts 41A are arranged at symmetrical positions so as to sandwich the fiber passage pipe 30. When the first rotating member 40A rotates, with the feeding direction serving as the axis, the first bundling member passage parts 41A move so as to depict an arc on the outer circumference of the optical fiber bundle 6 (the optical fiber bundle 6 passing through the fiber passage pipe 30), with the feeding direction serving as the axis. The first rotating member 40A is constituted by a first guide pipe 42A and a first retaining pipe 43A. Two first guide grooves 421A are formed in the first guide pipe 42A along the length direction. The first guide grooves 421A are covered by the first retaining pipe 43A to form the first bundling member passage parts 41A. When the first rotating member 40A rotates, with the feeding direction serving as the axis, the two bundling member passage parts 41A move so as to depict an arc on the outer circumference of the optical fiber bundle 6, with the feeding direction serving as the axis.

The second rotating member 40B is provided rotatably with respect to the first rotating member 40A. The second rotating member 40B has two second bundling member passage parts 41B. The two second bundling member passage parts 41B are arranged at symmetrical positions so as to sandwich the fiber passage pipe 30. When the second rotating member 40B rotates, with the feeding direction serving as the axis, the second bundling member passage parts 41B move so as to depict an arc on the outer circumference of the optical fiber bundle 6, with the feeding direction serving as the axis. The second rotating member 40B is constituted by a second guide pipe 42B and a second retaining pipe 43B. Two second guide grooves 421B are formed in the second guide pipe 42B along the length direction. The second guide grooves 421B are covered by the second retaining pipe 43B to form the second bundling member passage parts 41B. When the second rotating member 40B rotates, with the feeding direction serving as the axis, the two second bundling member passage parts 41B move so as to depict an arc on the outer circumference of the optical fiber bundle 6, with the feeding direction serving as the axis.

Figure 9A:
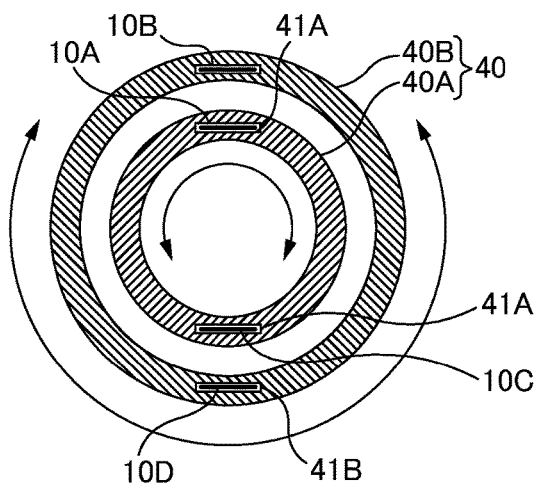
FIGS. 9A to 9E are diagrams illustrating the movement ranges of a first rotating member 40A and a second rotating member 40B.

FIGS. 9A to 9E are diagrams illustrating the movement ranges of the first rotating member 40A and the second rotating member 40B. It should be noted that FIGS. 9A to 9E do not illustrate the fiber passage pipe 30 arranged inside the rotating member 40 and the optical fiber bundle 6 passing through the fiber passage pipe 30. FIG. 9A illustrates the middle position of the first rotating member 40A and the second rotating member 40B. The "middle position" is the position in the middle of the movement range of the rotating member 40. At the middle position, the two first bundling member passage parts 41A and the two second bundling member passage parts 41B are aligned. The first rotating member 40A and the second rotating member 40B each oscillate within the range between 120 degrees clockwise and 120 degrees counter-clockwise (i.e., within the range of ±120 degrees) with the middle position serving as the center. Herein, "oscillation" refers to a to-and-from rotating motion with the feeding direction serving as the axis.

Figure 9B:
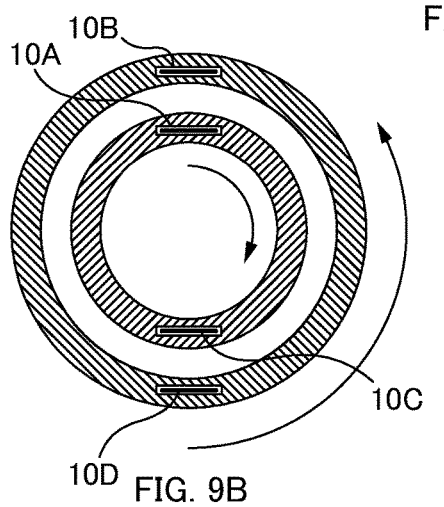
Figure 9D:
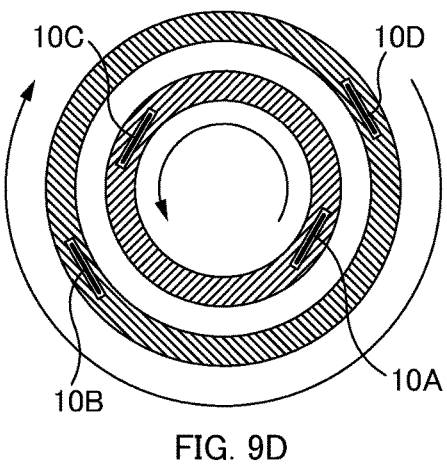
Figure 9C:
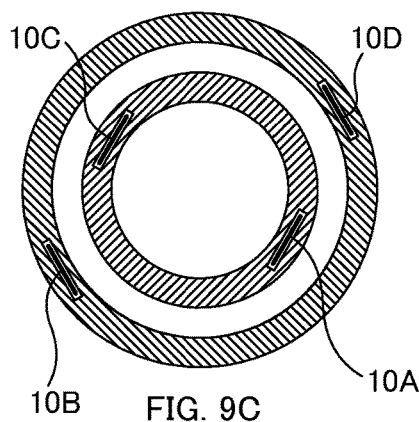

As illustrated in FIGS. 9B and 9C, when viewed from one side in the length direction, the first rotating member 40A rotates by 120 degrees clockwise from the middle position, and the second rotating member 40B rotates 120 degrees counter-clockwise from the middle position. The first bundling member passage parts 41A and the second bundling member passage parts 41B pass each other within a range from the state of FIG. 9B to the state of FIG. 9C. Thus, the four bundling members 10 are fed in the feeding direction while an intersection point between the bundling member 10A and the bundling member 10D is formed and an intersection point between the bundling member 10B and the bundling member 10C is formed on the outer circumference of the optical fiber bundle 6 at the rotating member 40's downstream end in the feeding direction.

Figure 9E:
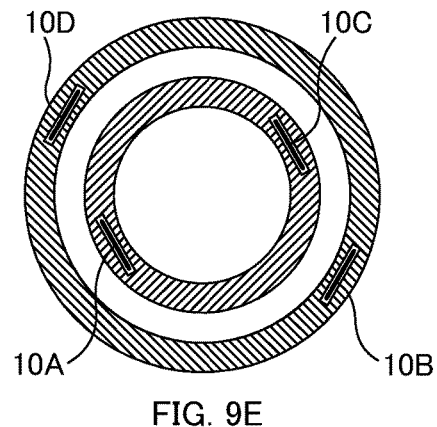

When the first rotating member 40A and the second rotating member 40B reach respective ends in their movement ranges, their rotating directions are reversed, and the first rotating member 40A and the second rotating member 40B rotate to the respective other ends of their movement ranges. For example, after the first rotating member 40A rotates clockwise and the second rotating member 40B rotates counter-clockwise as illustrated in FIGS. 9B and 9C, the first rotating member 40A then rotates counter-clockwise and the second rotating member 40B rotates clockwise as illustrated in FIGS. 9D and 9E. The first bundling member passage parts 41A and the second bundling member passage parts 41B pass each other also within a range from the state of FIG. 9D to the state of FIG. 9E. Thus, an intersection point between the bundling member 10A and the bundling member 10D is formed and an intersection point between the bundling member 10B and the bundling member 10C is formed on the outer circumference of the optical fiber bundle 6 at the rotating member 40's downstream end in the feeding direction.

Focusing on the bundling member 10A and the bundling member 10D, an intersection point is formed within the range from the state of FIG. 9B to the state of FIG. 9C, and an intersection point is formed within the range from the state of FIG. 9D to the state of FIG. 9E. The two intersection points are located on opposite sides from one another across the optical fiber bundle 6. The two intersection points formed on the opposite sides across the optical fiber bundle 6 are each fusion-bonded in the heating unit 50. In this way, the two joining points 15AD are formed so as to sandwich the optical fiber bundle 6, as illustrated in FIGS. 1A and 5B.

Similarly, focusing on the bundling member 10B and the bundling member 10C, an intersection point is formed within the range from the state of FIG. 9B to the state of FIG. 9C, and an intersection point is formed within the range from the state of FIG. 9D to the state of FIG. 9E. The two intersection points are located on opposite sides from one another across the optical fiber bundle 6. The two intersection points formed on the opposite sides across the optical fiber bundle 6 are each fusion-bonded in the heating unit 50. In this way, the two joining points 15BC are formed so as to sandwich the optical fiber bundle 6, as illustrated in FIGS. 1A and 5B.

Each bundling member 10 is wound so as to ultimately cover half the outer circumference of the optical fiber bundle 6 (i.e., 180 degrees). On the other hand, the rotating member 40 (the first rotating member 40A and the second rotating member 40B) that feeds each bundling member 10 is rotated by an angle (240 degrees) that is greater than the winding angle (180 degrees) at which the bundling member 10 is ultimately wound. This configuration is employed to suppress/prevent the intersection point between the two bundling members 10 from disappearing during the period after the bundling members 10 are fed out from the rotating member 40 until the bundling members 10 are joined in the heating unit 50, even if the bundling members 10 unwind and the winding angle of each bundling member 10 decreases.

It should be noted that, as illustrated in FIG. 8B, the respective downstream ends, in the feeding direction, of the fiber passage pipe 30, the first rotating member 40A, and the second rotating member 40B are located substantially at the same position. The optical fiber bundle 6 is fed out from the fiber passage pipe 30's downstream end in the feeding direction, and the bundling members 10 are fed out from the respective downstream ends, in the feeding direction, of the first rotating member 40A and the second rotating member 40B. When the first rotating member 40A and the second rotating member 40B oscillate with their feeding directions serving as the axis, the first bundling member passage parts 41A and the second bundling member passage parts 41B move to and from, with their feeding directions serving as the axis, so as to depict an arc on the outer circumference of the optical fiber bundle 6. Thus, the bundling members 10 are fed into the heating unit 50 on the downstream side in the feeding direction while intersection points between the two bundling members 10 are formed on the outer circumference of the optical fiber bundle 6 at the rotating member 40's downstream end in the feeding direction.

The heating unit 50 is a member (heater) that heats the intersection points between the bundling members 10 and fusion-bonds the bundling members 10 at their intersection points. The heating unit 50 is arranged downstream from the fiber passage pipe 30 and the rotating member 40 in the feeding direction. The heating unit 50 has a unit passage part 51 (through hole) through which the optical fiber unit 2 (the optical fiber bundle 6 and the bundling members 10) is passed. When the optical fiber bundle 6 and the bundling members 10, which constitute the optical fiber unit 2, pass through the heating unit 50, there are intersection points of the four bundling members 10 formed on the outer circumference of the optical fiber bundle 6. These intersection points are fusion-bonded together by being heated by the heating unit 50, and thus, the bundling members 10 are joined together.

With the aforementioned production method, as illustrated in FIG. 5B, the bundling member 10A is not only fusion-bonded and joined with the bundling member 10D (corresponding to "another bundling member") at the reverse sections where their winding directions with respect to the optical fiber bundle 6 are reversed, but also fusion-bonded and joined with the bundling member 10B (corresponding to a "different bundling member from said another bundling member") at the intersection points between the bundling member 10B and the bundling member 10A. It should be noted that the method for producing the optical fiber unit 2 is not limited to the aforementioned method, and other methods may be employed. Also, the joining of the bundling members 10 is not limited to fusion-bonding by applying heat, and bonding with an adhesive may be employed.

If the angle of rotation of the rotating member 40 (the first rotating member 40A and the second rotating member 40B) is made smaller in the aforementioned method, the bundling members 10 can alternatively be joined together as illustrated in the comparative example (FIG. 12B). It should be noted that, to join the bundling members 10 as in the comparative example illustrated in FIG. 12B, the oscillation period of the rotating member 40 has to be shortened. As a result, when the optical fiber unit 2 is produced, an abnormal tension is applied to the bundling members 10, which may make the joining points consecutively defective. In contrast, when the bundling members 10 are joined as in the present embodiment (FIG. 5B) by the aforementioned production method, the oscillation period of the rotating member 40 can be made long, which is advantageous in that the joining points 15 are less likely to be faulty.

Second Embodiment

Each optical fiber unit 2 in the first embodiment includes four bundling members 10, but the number of the bundling members 10 may be four or more. Each optical fiber unit 2 in a second embodiment includes six bundling members 10.

Figure 10:
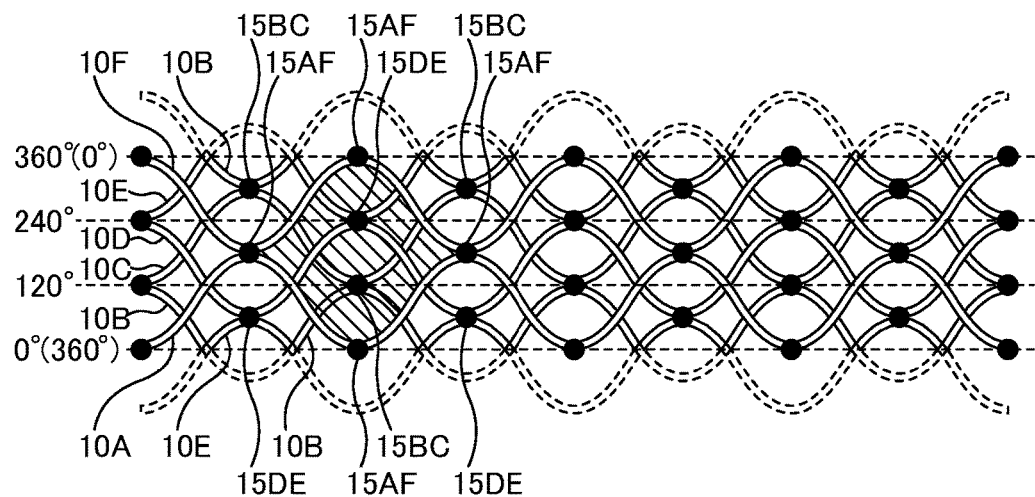
FIG. 10 is a developed view of bundling members 10 according to a second embodiment.

FIG. 10 is a developed view of the bundling members 10 according to the second embodiment. Also in the second embodiment, each bundling member 10 is wound on the outer circumference of the optical fiber bundle 6 along the length direction of the optical fiber bundle 6 while the winding direction of each bundling member 10 is reversed alternately. Each bundling member 10 is joined with another bundling member 10 at reverse sections where its winding direction is reversed. For example, a bundling member 10A is wound on the outer circumference of the optical fiber bundle 6 along the length direction of the optical fiber bundle 6 while the winding direction is reversed alternately. The bundling member 10A is joined with another bundling member 10F at the reverse sections where its winding direction is reversed.

The second embodiment includes three pairs of bundling members 10 whose winding directions are reversed at joining points 15 (the first embodiment included two pairs of bundling members 10). More specifically, in the second embodiment, the three pairs of bundling members 10 include a pair of the bundling member 10A and the bundling member 10F, a pair of a bundling member 10B and a bundling member 10C, and a pair of a bundling member 10D and a bundling member 10E. The phase of each pair of bundling members 10 is shifted from that of another pair of bundling members 10 by 120 degrees. In this way, the position of each joining point 15 (for example, a joining point 15AF) of each pair of bundling members 10 is shifted from that of a joining point (for example, a joining point 15BC or a joining point 15DE) of another pair of bundling members 10 in the length direction.

In FIG. 10, a region surrounded by the pair of bundling members 10 joined at reverse sections is cross-hatched. In the figure, the cross-hatching indicates a region surrounded by the bundling member 10A and the bundling member 10F between a joining point 15AF at a reverse section where their winding directions are reversed in a predetermined direction and a joining point 15AF at the next reverse section where their winding directions are reversed in the same direction. In other words, the region surrounded by the bundling member 10A and the bundling member 10F corresponding to one pitch is cross-hatched. Stated differently, one mesh cell formed of the pair of bundling members 10 (the bundling member 10A and the bundling member 10F) joined at the joining points 15AF is cross-hatched.

Also in the second embodiment, the cross-hatched region includes a joining point 15BC and a joining point 15DE which are at reverse sections of other pairs of bundling members 10. In this manner, in the present embodiment, a region surrounded by a pair of bundling members 10 (the bundling member 10A and the bundling member 10F in this example) to be joined at the reverse sections—where their winding directions are reversed in a predetermined direction—includes a joining point 15 at one of the reverse sections of another pair of bundling members 10 (in the example, the pair of the bundling member 10B and the bundling member 10C or the pair of the bundling member 10D and the bundling member 10E). In this way, even if the joining points 15AF are consecutively faulty, the joining point 15BC and the joining point 15DE (joining points in the cross-hatched region) prevent the mesh of the bundling members 10 that covers the outer circumference of the optical fiber bundle 6 from breaking. Therefore, also in the second embodiment, even if the joining points 15AF are consecutively faulty, it is possible to keep the state where the optical fiber bundle 6 is bundled by the bundling members 10.

Further, in the second embodiment, the cross-hatched region includes a plurality of joining points 15 (two in this example) at the reverse sections of other pairs of bundling members 10. With this configuration, in the second embodiment, at the time of mid-span branching, a worker needs to separate one joining point 15 (for example, the joining point 15AD) with the hands, and also needs to separate the plurality of joining points 15 (for example, the joining point 15BC and the joining point 15DE) in the region surrounded by the pair of bundling members 10 joined at the one joining point 15. In the second embodiment, since the joining points 15 that are to be separated at the time of mid-span branching are not arranged along the length direction, workability of the second embodiment is inferior to that of the first embodiment. However, the joining of the bundling members 10 is stronger, which is thus advantageous in that it is possible to easily keep the state where the optical fiber bundle 6 is bundled.

Also in the second embodiment, a range on the outer circumferential surface of the optical fiber bundle 6 occupied by one bundling member 10 includes another bundling member 10. For example, the range from 0 degrees to 180 degrees on the outer circumferential surface of the optical fiber bundle 6 occupied by the bundling member 10A includes a plurality of other bundling members 10 (the bundling member 10B, the bundling member 10C, the bundling member 10D, and the bundling member 10E in this example). In other words, also in the second embodiment, the range on the outer circumferential surface of the optical fiber bundle 6 occupied by the one bundling member 10 overlaps the ranges on the outer circumferential surface of the optical fiber bundle 6 occupied by other bundling members 10. With this configuration, even if, for example, the joining points 15AF are consecutively faulty and thereby the bundling member 10A cannot perform the function of bundling the optical fiber bundle 6, the other bundling members 10 prevent the mesh of the bundling members 10 that covers the outer circumference of the optical fiber bundle 6 from breaking.

Further, the second embodiment includes three pairs of bundling members 10 whose winding directions are reversed at the joining points 15, and each pair of bundling members is wound around the entire circumference of the optical fiber bundle 6. With this configuration, even if the joining points 15 (for example, the bundling members 15AF) of one pair of bundling members 10 (for example, the bundling member 10A and the bundling member 10F) are consecutively faulty, the other pairs of bundling members 10 can keep the state where the optical fiber bundle 6 is bundled.

It should be noted that, also in the second embodiment, each bundling member 10 may not only be joined with another bundling member 10 at the reverse sections where their winding directions with respect to the optical fiber bundle 6 are reversed, but may also be joined with a different bundling member 10 from said another bundling member at the intersection points between the different bundling member and the bundling member 10. For example, the bundling member 10A may not only be joined with the bundling member 10F at the reverse sections where their winding directions with respect to the optical fiber bundle 6 are reversed, but may also be joined with the bundling member 10B and/or the bundling member 10D at the intersection points between the bundling member 10B or the bundling member 10D and the bundling member 10A. This strengthens the joining of the bundling members 10, which makes it easy to keep the state where the optical fiber bundle 6 is bundled.

Third Embodiment

In the foregoing embodiments, each bundling member 10 is wound on the outer circumference of the optical fiber bundle 6 and is arranged such that the bundling member depicts an arc covering half the circumference of the bundle (i.e., 180 degrees) along the length direction of the optical fiber unit 2. Also in the foregoing embodiments, each bundling member 10 is joined with the same bundling member 10 at the reverse sections where their winding directions are reversed, irrespective of the direction in which its winding direction is reversed. It should be noted that the angle at which the bundling member 10 is wound in the S-Z configuration around the circumference is not limited to 180 degrees. In addition, each bundling member 10 may be joined with a different bundling member 10 depending on the direction in which its winding direction is reversed.

Figure 11:
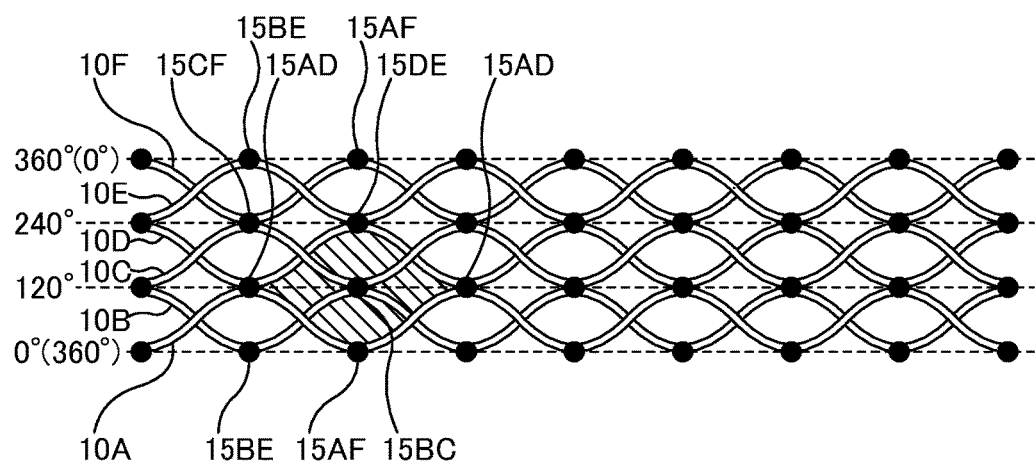
FIG. 11 is a developed view of bundling members 10 according to a third embodiment.

FIG. 11 is a developed view of bundling members 10 according to a third embodiment. Also in the third embodiment, each bundling member 10 is wound on the outer circumference of the optical fiber bundle 6 along the length direction of the optical fiber bundle 6 while the winding direction of each bundling member 10 is reversed alternately. Each bundling member 10 is joined with another bundling member 10 at reverse sections where its winding direction is reversed.

Each bundling member 10 is wound on the outer circumference of the optical fiber bundle 6 and is arranged such that the bundling member depicts an arc covering ⅓ of the circumference of the bundle (i.e., 120 degrees) along the length direction of the optical fiber unit 2. For example, a bundling member 10A is wound on the outer circumference of the optical fiber bundle 6 along the length direction of the optical fiber bundle 6 while the winding direction is reversed alternately. In this way, the bundling member 10A is arranged on the outer circumference of the optical fiber bundle 6 within a range from 0 degrees to 120 degrees.

Further, each bundling member 10 is joined with different bundling members 10 depending on the direction in which its winding direction is reversed. For example, the bundling member 10A is joined with a bundling member 10D at joining points 15AD at reverse sections where the winding direction of the bundling member 10A is reversed in a predetermined direction. Also, the bundling member 10A is joined with a bundling member 10F at joining points 15AF at reverse sections where the winding direction of the bundling member 10A is reversed in the opposite direction.

In FIG. 11, a region surrounded by a pair of bundling members 10 joined at reverse sections is cross-hatched. In the figure, the cross-hatching indicates a region surrounded by the bundling member 10A and the bundling member 10D between a joining point 15AD at a reverse section where their winding directions are reversed in a predetermined direction and a joining point 15AD at the next reverse section where their winding directions are reversed in the same direction. In other words, the region surrounded by the bundling member 10A and the bundling member 10D corresponding to one pitch is cross-hatched. Stated differently, one mesh cell formed of the pair of bundling members 10 (the bundling member 10A and the bundling member 10D) joined at the joining points 15AD is cross-hatched.

Also in the third embodiment, the cross-hatched region includes a joining point 15BC at a reverse section of another pair of bundling members 10. With this configuration, even if the joining points 15AD are consecutively faulty, the joining point 15BC (joining point in the cross-hatched region) prevents the mesh of the bundling members 10 that covers the outer circumference of the optical fiber bundle 6 from breaking. Therefore, also in the third embodiment, even if the joining points 15AD are consecutively faulty, it is possible to keep the state where the optical fiber bundle 6 is bundled by the bundling members 10.

In the third embodiment, the joining points 15 to be separated at the time of branching are arranged along the length direction, similarly to the first embodiment. In other words, one joining point 15 (for example, the joining point 15AD) and another joining point 15 (for example, the joining point 15BC) which is of a different pair of bundling members 10 and which is in the region surrounded by the pair of bundling members 10 joined at the one joining point 15 are arranged along the length direction. With this configuration, also in the third embodiment, after separating a discretionary joining point 15, the worker can sequentially separate the joining points 15 adjacent to the separated joining point 15 in the length direction with the separated joining point 15 as a starting point. Thus, it is easier to locate the joining points 15 to separate.

Also in the third embodiment, a range on the outer circumferential surface of the optical fiber bundle 6 occupied by one bundling member 10 includes another bundling member 10. For example, the range from 0 degrees to 120 degrees on the outer circumferential surface of the optical fiber bundle 6 occupied by the bundling member 10A includes another bundling member 10B. In other words, also in the third embodiment, the range on the outer circumferential surface of the optical fiber bundle 6 occupied by one bundling member 10 overlaps the range on the outer circumferential surface of the optical fiber bundle 6 occupied by another bundling member 10. With this configuration, even if the joining points 15AD are consecutively faulty and thereby the bundling member 10A cannot perform the function of bundling the optical fiber bundle 6, the other bundling member 10B prevents the mesh of the bundling members 10 that covers the outer circumference of the optical fiber bundle 6 from breaking.

It should be noted that, also in the third embodiment, each bundling member 10 may not only be joined with another bundling member 10 at the reverse sections where their winding directions with respect to the optical fiber bundle 6 are reversed, but may also be joined with a different bundling member 10 from the other bundling member at the intersection points between the different bundling member and the bundling member 10. For example, the bundling member 10A may not only be joined with the bundling member D and the bundling member 10F at the reverse sections where the winding direction of the bundling member 10A with respect to the optical fiber bundle 6 is reversed, but may also be joined with the bundling member 10B at intersection points between the bundling member 10B and the bundling member 10A. This strengthens the joining of the bundling members 10, which makes it easy to keep the state where the optical fiber bundle 6 is bundled.

Other Embodiments

The foregoing embodiments are for facilitating the understanding of the present invention, and are not to be construed as limiting the present invention. It goes without saying that the present invention may be modified and/or improved without departing from the gist thereof, and that the present invention encompasses any equivalents thereof.

Number of Bundling Members 10:

The foregoing embodiments describe examples in which the number of bundling members 10 wound on the optical fiber bundle 6 is four or six. However, the number of bundling members 10 to be provided in a single optical fiber unit 2 is not limited thereto. For example, the number of bundling members may be eight or more or an odd number.

Rotating Member 40:

The aforementioned rotating member 40 is constituted by the first rotating member 40A and the second rotating member 40B. It should be noted that the number of rotatable members constituting the rotating member 40 is not limited to two and may be three or more. Further, although the aforementioned rotating member is constituted by a circular-cylindrical member (pipe), the rotating member may, for example, be constituted by a ring-shaped member.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber cable;
2: Optical fiber unit;
3: Outer sheath;
4A: Tension member;
4B: Rip cord;
5: Wrapping tape;
6: Optical fiber bundle;
7: Intermittently connected optical fiber ribbon;
8: Optical fiber;
9A: Connection part;
9B: Non-connected part;
10: Bundling member;
11: Core part;
12: Cover part;
15: Joining point;
20: Production device;
30: Fiber passage pipe;
40: Rotating member (40A: First rotating member; 40B: Second rotating member);
41: Bundling member passage part (41A: First bundling member passage part; 41B: Second bundling member passage part);
42A: First guide pipe;
421A: First guide groove;
42B: Second guide pipe;
421B: Second guide groove;
43A: First retaining pipe;
43B: Second retaining pipe;
50: Heating unit;
51: Unit passage part.

The invention claimed is:

1. An optical fiber unit comprising:
an optical fiber bundle formed by bundling a plurality of optical fibers; and
a plurality of bundling members, wherein:
each of the bundling members is
wound on an outer circumference of the optical fiber bundle along a length direction of the optical fiber bundle while a winding direction of the bundling member is reversed alternately, and
joined with another bundling member at reverse sections where the winding direction of the bundling member is reversed; and
a region surrounded by a pair of the bundling members to be joined at the reverse sections comprises a joining point at one of the reverse sections of another pair of the bundling members.

2. The optical fiber unit according to claim 1, wherein:
one pair of the bundling members is wound around the entire circumference of the optical fiber bundle; and
another pair of the bundling members is wound around the entire circumference of the optical fiber bundle.

3. The optical fiber unit according to claim 1, wherein the bundling member is joined with the another bundling member at the reverse sections, and is also joined with a different bundling member at intersection points between the different bundling member and the bundling member.

4. The optical fiber unit according to claim 1, wherein the joining point at one of the reverse sections of one pair of the bundling members and another joining point at one of the reverse sections of a different pair of the bundling members and in a region surrounded by the one pair of the bundling members joined at the joining point are arranged along the length direction of the optical fiber bundle.

5. The optical fiber unit according to claim 1, wherein the region comprises a plurality of joining points at the reverse sections of other pairs of the bundling members.

6. An optical fiber cable comprising:
a plurality of optical fiber units; and
an outer sheath that covers the plurality of optical fiber units, wherein:
each of the optical fiber units comprises:
an optical fiber bundle formed by bundling a plurality of optical fibers; and
a plurality of bundling members;
each of the bundling members is
wound on an outer circumference of the optical fiber bundle along a length direction of the optical fiber bundle while a winding direction of the bundling member is reversed alternately, and
joined with another bundling member at reverse sections where the winding direction of the bundling member is reversed; and
a region surrounded by a pair of the bundling members to be joined at the reverse sections comprises a joining point at one of the reverse sections of another pair of the bundling members.

* * * * *